US010353375B2

United States Patent
Tanaka

(10) Patent No.: US 10,353,375 B2
(45) Date of Patent: Jul. 16, 2019

(54) MACHINE TOOL CONTROLLER WITH POWER SUPPLY VOLTAGE ABNORMALITY DETECTION

(71) Applicant: FANUC CORPORATION, Yamanashi (JP)

(72) Inventor: Shunpei Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 44 days.

(21) Appl. No.: 15/623,378

(22) Filed: Jun. 15, 2017

(65) Prior Publication Data
US 2018/0004186 A1  Jan. 4, 2018

(30) Foreign Application Priority Data
Jun. 30, 2016 (JP) .................................. 2016-130387

(51) Int. Cl.
*G05B 19/406* (2006.01)
*B23Q 5/58* (2006.01)

(52) U.S. Cl.
CPC ............ *G05B 19/406* (2013.01); *B23Q 5/58* (2013.01); *G05B 2219/34474* (2013.01); *G05B 2219/50081* (2013.01); *G05B 2219/50083* (2013.01); *G05B 2219/50084* (2013.01); *G05B 2219/50203* (2013.01)

(58) Field of Classification Search
None
See application file for complete search history.

(56) References Cited

U.S. PATENT DOCUMENTS

| 2008/0086659 A1* | 4/2008 | Ishikawa | G06F 11/1441 714/22 |
| 2011/0234141 A1* | 9/2011 | Kataoka | G05B 19/406 318/563 |
| 2012/0098475 A1* | 4/2012 | Noguchi | H02P 29/025 318/479 |

FOREIGN PATENT DOCUMENTS

| JP | H6-19520 A | 1/1994 |
| JP | H7-152411 A | 6/1995 |
| JP | 2004-220384 A | 8/2004 |

(Continued)

OTHER PUBLICATIONS

English translation of Sakai Japanese Patent No. 04205005 (1992).*

*Primary Examiner* — Bernard G Lindsay
(74) *Attorney, Agent, or Firm* — Hauptman Ham, LLP

(57) ABSTRACT

A machine tool controller includes: a voltage detection unit which detects a voltage value of an input power supply; a time measurement unit which measures an occurrence time and a duration time when a voltage drop state occurs with respect to the voltage value; an abnormality determination unit which determines whether a low voltage abnormality or a power failure occurs with respect to the input power supply based on the voltage value and the duration time of the voltage drop state; a machining management unit which acquires a machining condition command and machining information of the machine tool; and a storage unit which stores the voltage value detected by the voltage detection unit, the occurrence time of the voltage drop state measured by the time measurement unit, and the machining information when the abnormality determination unit determines that the low voltage abnormality occurs with respect to the input power supply.

2 Claims, 4 Drawing Sheets

(56) References Cited

FOREIGN PATENT DOCUMENTS

| | | | |
|---|---|---|---|
| JP | 2008-176579 | A | 7/2008 |
| JP | 2010-113443 | A | 5/2010 |
| JP | 2011-209936 | A | 10/2011 |
| JP | 2015-43794 | A | 3/2015 |
| JP | 2015-229224 | A | 12/2015 |
| JP | 2016-31643 | A | 3/2016 |

\* cited by examiner

FIG. 3

| OCCURRENCE DATE AND TIME | POWER SUPPLY STATE | MACHINING INFORMATION (PROGRAM) |
|---|---|---|
| 2016.05.12 10:30 | LOW VOLTAGE ABNORMALITY (WARNING) | :<br>M41;<br>G90 G00 X100.0 Y100.0;<br>G32 P1 Q1;<br>: |
| 2016.05.12 15:00 | POWER FAILURE (ALARM) | :<br>G01 X300.0 F300.0;<br>Y300.0;<br>X100.0;<br>: |
| 2016.05.13 16:00 | LOW VOLTAGE ABNORMALITY (WARNING) | :<br>M40;<br>G72 X200.0 Y200.0;<br>G26 I50.0 J0 K10.0 T101;<br>: |

MACHINE TOOL CONTROLLER WITH POWER SUPPLY VOLTAGE ABNORMALITY DETECTION

RELATED APPLICATIONS

The present application claims priority to Japanese Patent Application No. 2016-130387 filed Jun. 30, 2016, the disclosure of which is hereby incorporated by reference herein in its entirety.

BACKGROUND OF THE INVENTION

1. Field of the Invention

The present invention relates to a machine tool controller.

2. Description of the Related Art

In a machine tool, a motor is used as a drive source (spindle motor) for driving a spindle provided with a workpiece and a tool and as a drive source (feed axis motor) for driving a feed axis which moves the spindle and a workpiece. In such a machine tool, alternating current power supplied from an alternating current power supply side is once converted by a rectifier to direct current power and then the direct current power is further converted by an inverter to alternating current power, and such alternating current power is used as drive power for the motor provided for each drive axis. A machine tool controller controls an alternating current output from each inverter to have a desired voltage and a desired frequency, thereby controlling a speed, a torque, or a position of a rotor of each motor connected to an alternating current side of each inverter.

When such a power failure that a motor drive device which is used for the machine tool and a peripheral equipment thereof fails to continue to operate occurs, it is possible that a problem in an operation of the motor may occur, and some problems, such as damage and deformation of the motor drive device which drives the motor, the tool connected to the motor which is driven by the motor drive device, a workpiece which is machined by the tool, a manufacturing line including the motor drive device, and the like, may occur.

Thus, for example, as disclosed in Japanese Unexamined Patent Publication (Kokai) No. 2011-209936, it is common that the machine tool controller includes an element which detects a power failure of an input power supply used to drive the machine tool, and outputs an alarm and performs a protection operation for avoiding or minimizing the above problems when a power failure is detected.

Further, in a field of machine tools, an alarm generation history is stored in the machine tool controller to be widely used in grasping an operation state of the machine tool and the like and trouble shooting. In addition, not limited to the above, also in a general machine, when a power supply abnormality occurs, information relating thereto is stored, and later the information as stored is utilized for some operations.

For example, as disclosed in Japanese Unexamined Patent Publication (Kokai) No. 2015-43794, in a washing machine, an occurrence date and time of a power failure of the input power supply and an operation state are stored in a storage unit, and after recovery from the power failure, a content of the storage unit is read and if possible, an operation at a time of the power failure is resumed.

In recent years, as motor control techniques make progress, machining precision of the machine tool has remarkably improved, whereas in machining which necessitates high precision, such as finish machining, even due to a slight power supply abnormality, such as a temporary voltage drop, a slight voltage drop, or an instantaneous power failure, an influence on machining precision is feared. Thus, to realize high precision machining in the machine tool, such some measures as to enable a grasp of a situation relating to not only a power failure but also a slight power supply abnormality have been demanded.

Such a slight power supply abnormality fails to satisfy power failure determination conditions and thus fails to be detected as a power failure, and machining of a product by the machine tool continues. As a result, an alarm is not generated, and as a matter of course, an alarm generation history is not stored. Thus, there has been a problem that when a defect in a product as machined by the machine tool occurs, specifying a cause in trouble shooting, i.e., whether the cause thereof lies in a slight power supply abnormality or in another factor is difficult.

On the other hand, if power failure determination conditions are relaxed such that determination as a power failure is easily made, even a slight power supply abnormality is determined as a power failure, a protection operation is performed so that the machine tool is stopped, which consequently leads to reduction in a percentage of machine usage. Since once a protection operation is performed, the manufacturing line is stopped to generate economic losses, in machining which does not necessitate high precision, minimizing execution of a protection operation is preferable.

SUMMARY OF INVENTION

Thus, it has been desired to provide a machine tool controller which facilitates specification of a cause and traceability when a defect in a product as machined by a machine tool occurs at a time of an occurrence of an abnormality of an input power supply used to drive the machine tool.

According to one aspect of the present disclosure, a machine tool controller includes: a voltage detection unit which detects a voltage value of an input power supply used to drive a machine tool; a time measurement unit which measures an occurrence time and a duration time of a voltage drop state when the voltage drop state occurs with respect to the voltage value detected by the voltage detection unit; an abnormality determination unit which determines whether a low voltage abnormality or a power failure occurs with respect to the input power supply based on the voltage value detected by the voltage detection unit and the duration time of the voltage drop state measured by the time measurement unit and in accordance with a predetermined low voltage abnormality determination condition and a predetermined power failure determination condition; a machining management unit which acquires a machining condition command and machining information of the machine tool; and a storage unit which stores the voltage value detected by the voltage detection unit, the occurrence time of the voltage drop state measured by the time measurement unit, and the machining information acquired by the machining management unit when the abnormality determination unit determines that the low voltage abnormality occurs with respect to the input power supply.

Herein, the predetermined low voltage abnormality determination condition may include a first voltage threshold value and a first time threshold value which serve as a determination reference as to whether a low voltage abnormality occurs with respect to the input power supply, and the abnormality determination unit may determine that the low voltage abnormality occurs with respect to the input power supply when a state in which the voltage value detected by the voltage detection unit is less than the first voltage threshold value continues over the first time threshold value or larger.

Further, the predetermined power failure determination condition may include a second voltage threshold value and a second time threshold value which serve as a determination reference as to whether a power failure occurs with respect to the input power supply, the second voltage threshold value may be smaller than the first voltage threshold value, the second time threshold value may be larger than the first time threshold value, and the abnormality determination unit may determine that a power failure occurs with respect to the input power supply when a state in which the voltage value detected by the voltage detection unit is less than the second voltage threshold value continues over the second time threshold value or larger.

The machine tool controller may further comprise an output unit which outputs the voltage value detected by the voltage detection unit, the occurrence time of the voltage drop state measured by the time measurement unit, and the machining information acquired by the machining management unit which are stored in the storage unit.

The machine tool controller may further comprise a protection operation unit which outputs a withdrawal operation command for preventing damage to the machine tool, a tool located at the machine tool, and a workpiece which is machined by the tool when the abnormality determination unit determines that a power failure occurs with respect to the input power supply.

BRIEF DESCRIPTION OF THE DRAWINGS

The present invention will be more clearly understood with reference to the following accompanying drawings:

FIG. 3 is a diagram illustrating a display example by a display unit according to the embodiment of the present disclosure.

DETAILED DESCRIPTION

Figure 1:
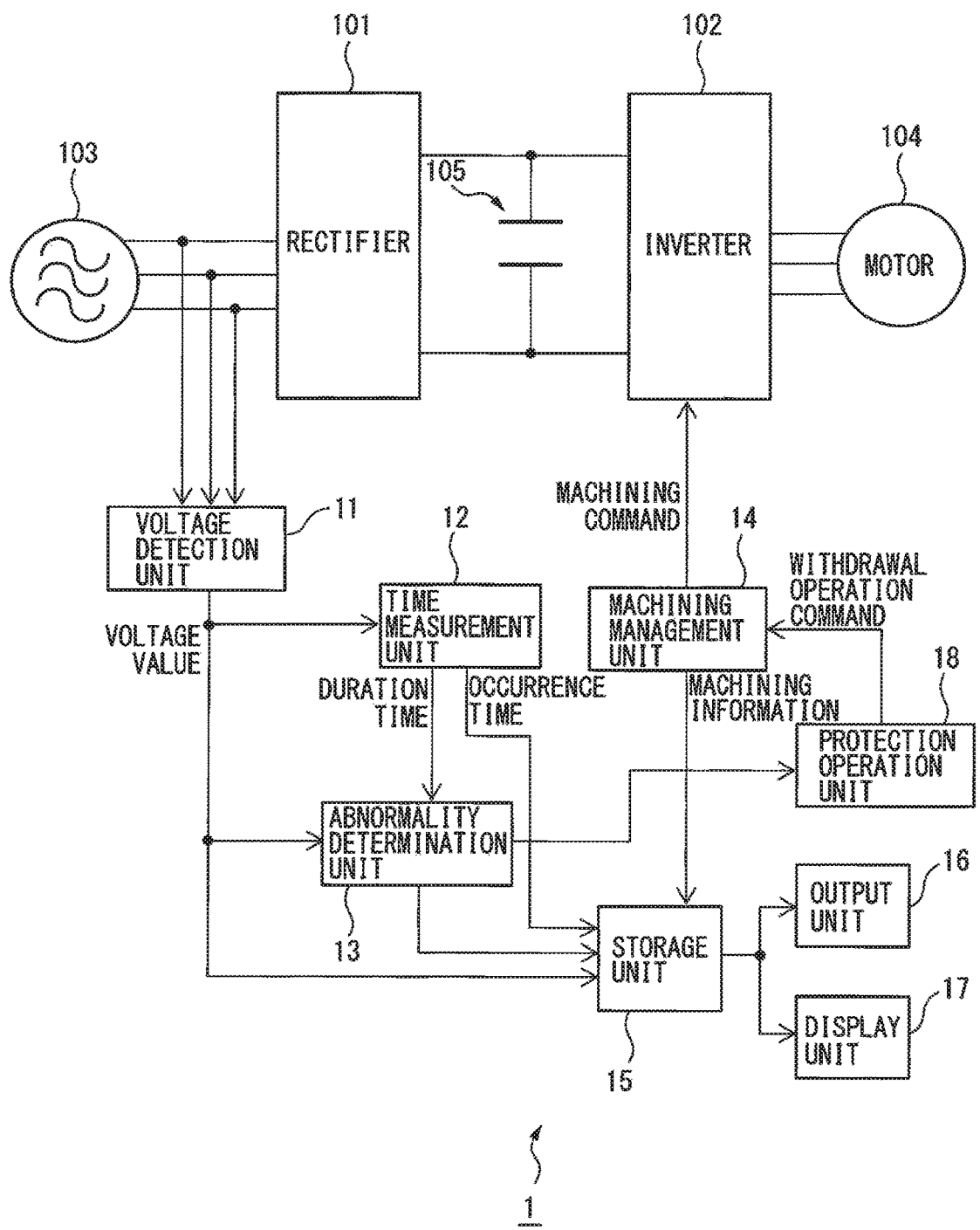
FIG. 1 is a diagram illustrating a configuration of a machine tool controller according to an embodiment of the present disclosure.

Next, embodiments of the present disclosure will be described with reference to the accompanying drawings. To facilitate understanding, the figures are suitably changed in scale. Further, the embodiments as illustrated in the drawings are one example for carrying out one aspect of the present disclosure, and the embodiments as illustrated are not limitative.

FIG. 1 is a diagram illustrating a configuration of a machine tool controller according to an embodiment of the present disclosure. Generally in machine tools, each drive axis is provided with a motor, but herein, an example in which one motor 104 is driven and controlled will be described. However, note that the number of the motor 104 is not to particularly limit this embodiment. In a machine tool, the motor 104 is used, e.g., as a drive source (spindle motor) for driving a spindle provided with a workpiece and a tool and as a drive source (feed axis motor) for driving a feed axis which moves the spindle and a workpiece, but for clarity of description herein, illustration of the workpiece, the tool, and a mechanism relating thereto is omitted. Examples of the machine tool include an NC machine tool, an injection molding machine, an industrial robot for arc welding and the like, a PLC, a conveyor, a measurement device, a test device, a press, an injector, a printing machine, a die casting machine, a food machine, a packing machine, a welding machine, a washing machine, a coating machine, an assembly device, a mounting machine, a woodworking machine, a sealing machine, or a cutting machine, but a type of the machine tool itself is not to particularly limit the embodiment.

Further, a type and a configuration of the motor 104 is not to limit the present embodiment, and an alternating current motor, such as an induction motor and a synchronous motor, or a direct current motor may be employed.

FIG. 1 illustrates a general configuration of a motor drive device when the motor 104 is a three-phase alternating current motor and a power supply is an alternating current power supply 103 by way of example. In such a case, alternating current power supplied from the alternating current power supply 103 side is once converted by a rectifier 101 to direct current power and then the direct current power is further converted by an inverter 102 to alternating current power, which is used by the motor 104 as drive power.

The rectifier 101 converts alternating current power supplied from the alternating current power supply 103 side to direct current power and outputs the same to a direct current (DC) link which is a direct current side. In the embodiment of the present disclosure, an embodiment of the rectifier 101 which is employed is not particularly limited, and for example, a diode rectifier or a PWM (pulse width modulation) control type rectifier internally provided with a semiconductor switching element may be employed. When the rectifier 101 is a PWM control type rectifier, the rectifier 101 is composed of a bridge circuit of the semiconductor switching element and a diode inversely connected thereto in parallel. In such a case, examples of the semiconductor switching element include an IGBT (insulated gate bipolar transistor), a thyristor, GTO (gate turn-off) thyristor, a transistor and the like, but a type of the semiconductor switching element itself is not to particularly limit the present embodiment and other semiconductor switching elements may be employed.

The DC link which connects a direct current output side of the rectifier 101 and a direct current input side of the inverter 102 is provided with a smoothing capacitor 105 (also referred to as DC link capacitor). The smoothing capacitor 105 has a function of restraining pulsating components of a direct current output of the rectifier 101 and also a function of accumulating direct current power.

The inverter 102 converts direct current power outputted by the rectifier 101 to alternating current power for driving the motor 104 and outputs the same. The inverter 102 is composed of a bridge circuit of a semiconductor switching element and a diode inversely connected thereto in parallel for a PWM inverter and the like, for example. In such a case, examples of the semiconductor switching element include an IGBT, a thyristor, GTO thyristor, a transistor and the like, but a type of the semiconductor switching element itself is not to particularly limit the present embodiment and other semiconductor switching elements may be employed. Further, the inverter 102 switching operates the internal switching element based on a motor drive command received from a machining management unit 14 as described below and converts direct current power supplied from the rectifier 101 through the DC link to alternating current power having a desired voltage and a desired frequency for driving the motor 104. Accordingly, the motor 104 operates based on alternating current power supplied having a variable voltage and a variable frequency.

A machine tool controller 1 according to the embodiment of the present disclosure includes a voltage detection unit 11, a time measurement unit 12, an abnormality determination unit 13, the machining management unit 14, and a storage unit 15. Further, the controller 1 includes an output unit 16, a display unit 17, and a protection operation unit 18.

The voltage detection unit 11 detects a voltage value of an input power supply used to drive the machine tool. In an example as illustrated in FIG. 1, since a three-phase alternating current power supply is used as the input power supply, as an alternating current voltage detection method by the voltage detection unit 11, for example, a method in which a vector norm on two-phase coordinates obtained by three-phase/two-phase converting an alternating current voltage on three-phase coordinates of the alternating current power supply 103 side of the rectifier 101 is set to be an alternating current voltage value, a method in which a crest value of voltage of an alternating current voltage on three-phase coordinates of the alternating current power supply 103 side of the rectifier 101 is set to be an alternating current voltage value, and the like may be employed. The voltage value detected by the voltage detection unit 11 is transmitted to the time measurement unit 12 and the abnormality determination unit 13, but also transmitted to the storage unit 15, if needed.

The time measurement unit 12 measures an occurrence time and a duration time of a voltage drop state when the voltage drop state occurs with respect to the voltage value detected by the voltage detection unit 11.

The abnormality determination unit 13 determines whether a low voltage abnormality or a power failure occurs with respect to the input power supply based on the voltage value detected by the voltage detection unit 11 and the duration time of the voltage drop state measured by the time measurement unit 12 in accordance with predetermined low voltage abnormality determination conditions and predetermined power failure determination conditions. Description will be made in more detail with reference to FIG. 2 in the following.

Figure 2:
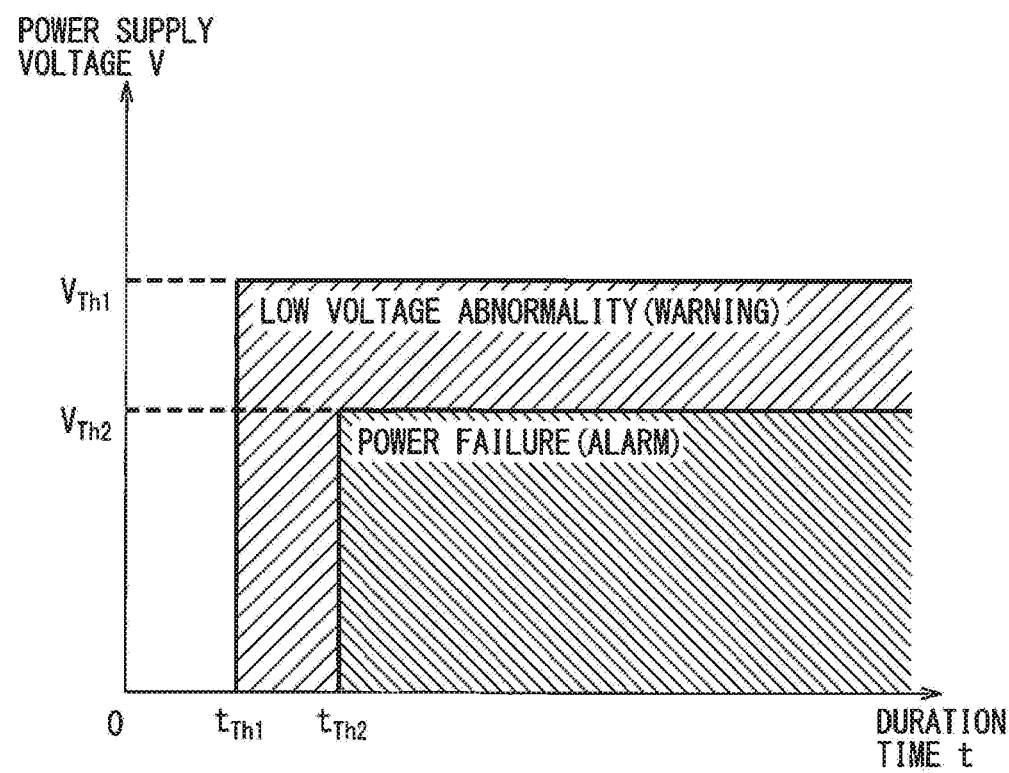
FIG. 2 is a diagram illustrating low voltage abnormality determination conditions and power failure determination conditions which are used in an abnormality determination unit according to the embodiment of the present disclosure.

FIG. 2 is a diagram illustrating the low voltage abnormality determination conditions and the power failure determination conditions which are used in the abnormality determination unit according to the embodiment of the present disclosure. In FIG. 2, the horizontal axis indicates a duration time of a voltage drop state when the voltage drop state occurs with respect to a voltage value detected by the voltage detection unit 11, and the vertical axis indicates a voltage value of the input power supply detected by the voltage detection unit 11.

With respect to the low voltage abnormality determination conditions used for abnormality determination processing by the abnormality determination unit 13, as a determination reference as to whether a low voltage abnormality occurs with respect to the input power supply, a first voltage threshold value $V_{Th1}$ and a first time threshold value $t_{Th1}$ are set. Further, with respect to the power failure determination conditions used for abnormality determination processing by the abnormality determination unit 13, as a determination reference as to whether a power failure occurs with respect to the input power supply, a second voltage threshold value $V_{Th2}$ and a second time threshold value $t_{Th2}$ are set. The second voltage threshold value $V_{Th2}$ is set to be a value smaller than the first voltage threshold value $V_{Th1}$, and the second time threshold value $t_{Th2}$ is set to be a value larger than the first time threshold value $t_{Th1}$. In particular, the first voltage threshold value $V_{Th1}$ and the first time threshold value $t_{Th1}$ may be appropriately set in accordance with precision of a product as machined by the machining tool. For example, it is possible that when a voltage drop state occurs, the first voltage threshold value $V_{Th1}$ and the first time threshold value $t_{Th1}$ are set to be such a value as to be capable of detecting a low voltage abnormality and assuring high precision machining, or, when a product which does not necessitate high precision is machined, the first voltage threshold value $V_{Th1}$ is set to be relatively small and the first time threshold value $t_{Th1}$ is set to be relatively large with priority to a continuous operation of the machine tool. Such threshold values which constitute the low voltage abnormality determination conditions and the power failure determination conditions are rewritably stored in a common storage area (unillustrated) provided in the abnormality determination unit 13. When the machine tool controller 1 operates, the abnormality determination unit 13 acquires the low voltage abnormality determination conditions and the power failure determination conditions from the storage area.

When a state in which the voltage value detected by the voltage detection unit 11 is less than the first voltage threshold value $V_{Th1}$ continues over the first time threshold value $t_{Th1}$ or larger, the abnormality determination unit 13 determines that a low voltage abnormality occurs with respect to the input power supply and outputs a warning signal to the storage unit 15 as described below. Further, when a state in which the voltage value detected by the voltage detection unit 11 is less than the second voltage threshold value $V_{Th2}$ continues over the second time threshold value $t_{Th2}$ or larger, the abnormality determination unit 13 determines that a power failure occurs with respect to the input power supply and outputs an alarm signal to the storage unit 15 and the protection operation unit 18 as described below. Note that as apparent from FIG. 2, there exists a relationship in which when the abnormality determination unit 13 determines that "a power failure occurs" with respect to the input power supply, it is also determined that "a low voltage abnormality occurs".

The machining management unit 14 is to acquire a machining condition command and machining information of the machine tool and is provided in, e.g., a numerical control device.

The machining condition command of the machine tool by the machining management unit 14 is based on a machining program (NC program), and examples thereof include a program in which the motor 104 drives the spindle provided with a workpiece and the tool and drives a feed axis which moves the spindle and a workpiece.

The machining information of the machine tool acquired by the machining management unit 14 include, for example, in addition to the machining program (NC program), a temperature, humidity, or pressure inside/outside of a machine tool apparatus, and the like, or may include information other than the above. The temperature, humidity, or pressure inside/outside the machine tool apparatus is detected by each type of sensors (unillustrated) connected to the machining management unit 14.

The storage unit 15 stores the voltage value detected by the voltage detection unit 11, the occurrence time of the voltage drop state (i.e. low voltage abnormality) measured by the time measurement unit 12, and the machining information acquired by the machining management unit 14 when the abnormality determination unit 13 determines that a low voltage abnormality occurs with respect to the input power supply. As described above, since cases in which it is determined that "a low voltage abnormality occurs" also include a case in which it is determined that "a power failure occurs", also when the abnormality determination unit 13 determines that a power failure occurs with respect to the input power supply, the storage unit 15 stores the voltage value detected by the voltage detection unit 11, the occurrence time of the voltage drop state (i.e. power failure) measured by the time measurement unit 12, and the machining information acquired by the machining management unit 14. Further, when the abnormality determination unit 13 determines that a power failure occurs with respect to the input power supply, the storage unit 15 stores a fact that "an alarm is generated" as well. Thus, the storage unit 15 stores the voltage value detected by the voltage detection unit 11 and the machining information acquired by the machining management unit 14 as associated with the occurrence time of the voltage drop state (i.e. power failure). The storage unit 15 is composed of a non-volatile memory backed up by, e.g., a battery. Whether the abnormality determination unit 13 determines that a low voltage abnormality occurs with respect to the input power supply can be determined based on whether the abnormality determination unit 13 outputs a warning signal.

The output unit 16 outputs the voltage value detected by the voltage detection unit 11, the occurrence time of the voltage drop state measured by the time measurement unit 12, and the machining information acquired by the machining management unit 14 which are stored in the storage unit 15. The output unit 16 may be individually constructed by, e.g., each type of connectors or may be constructed as a wireless communication device.

The display unit 17 displays the voltage value detected by the voltage detection unit 11, the occurrence time of the voltage drop state measured by the time measurement unit 12, an abnormality state (warning/alarm) determined by the abnormality determination unit 13, and the machining information acquired by the machining management unit 14 which are stored in the storage unit 15. Examples of the display unit 17 include displays of a personal computer and a touch panel and a display attached to the machine tool. Alternatively, an embodiment of a display in which a printout is made on a paper and the like using a printer may be employed. Further alternatively, it may be configured such that the voltage value detected by the voltage detection unit 11, the occurrence time of the voltage drop state measured by the time measurement unit 12, and the machining information acquired by the machining management unit 14 which are outputted by the output unit 16 may be stored, e.g. in a hard disk, a recording media, such as a CD-R, or a DVD-R, a network storage, or the like and displayed by the display unit 17 at a time desired by the operator. FIG. 1 is illustrated such that the display unit 17 and the output unit 16 are arranged in parallel, but the display unit 17 may be provided in the subsequent stage of the output unit 16.

By the display of the display unit 17, the operator can easily grasp the date and time of occurrence of a low voltage abnormality or a power failure, a waveform of the voltage value detected by the voltage detection unit 11 when the low voltage abnormality or the power failure occurs, and the machining information corresponding to the low voltage abnormality or the power failure. FIG. 3 is a diagram illustrating a display example by the display unit according to the embodiment of the present disclosure. In an exemplification as illustrated in FIG. 3, the display unit 17 displays a waveform of the voltage value detected by the voltage detection unit 11 at such a time as to correspond to the date and time of the occurrence of a low voltage abnormality or a power failure and the machining information (machining program in the example as illustrated).

By way of example, a case in which the first voltage threshold value $V_{Th1}$ is set to be 180 V, the second voltage threshold value $V_{Th2}$ is set to be 140 V, the first time threshold value $t_{Th1}$ is set to be 1 millisecond, and the second time threshold value $t_{Th2}$ is set to be 15 milliseconds is examined. In the example as illustrated in FIG. 3, cases in which at the occurrence time of "10:30, May 12, 2016", a state of 0 V continues over 5 milliseconds, which is determined as a low voltage abnormality, at the occurrence time of "15:00, May 12, 2016", a state of 0 V continues over 50 milliseconds, which is determined as a power failure, and at the occurrence time of "16:00, May 13, 2016", a state of 60 V continues over 10 milliseconds, which is determined as a low voltage abnormality are indicated, and as the machining information at each time, a machining program is indicated. Note that display contents, such as numerical values and the program as illustrated in FIG. 3, are merely an example.

Thus, the display unit 17 displays the voltage value detected by the voltage detection unit 11 and the machining information acquired by the machining management unit 14 as associated with the occurrence time of the voltage drop state (low voltage abnormality or power failure), and thus the operator easily traces when and what power supply abnormality occurs and what influence is made on machining at such a time. For example, it becomes easy for the operator to find out a defective workpiece as machined at such a time based on the occurrence time of a low voltage abnormality and the machining information at such a time which are displayed by the display unit 17 (improvement in traceability), and accordingly the total number of workpieces to be inspected may be reduced to reduce an inspection time and a failure to detect a defective product may be prevented. Further for example, when a defective workpiece is produced, the operator can easily specify a cause of a defect (trouble shooting) based on a display content of the display unit 17, which display content may be also utilized for future defect prevention measures, production plan proposals, and the like.

The protection operation unit 18 outputs a withdrawal operation command for preventing damage to the machine tool, the tool provided to the machine tool, and a workpiece which is machined by the tool when the abnormality determination unit 13 determines that a power failure occurs with respect to the input power supply. Whether the abnormality determination unit 13 determines that a power failure occurs with respect to the input power supply can be determined based on whether the abnormality determination unit 13 outputs an alarm signal. When receiving the alarm signal from the abnormality determination unit 13, the protection operation unit 18 outputs, to the machining management unit 14, a withdrawal operation command for preventing damage to the machine tool, the tool provided to the machine tool, and a workpiece which is machined by the tool if the abnormality determination unit 13 determines that a power failure occurs with respect to the input power supply. In response to the reception of the withdrawal operation command from the protection operation unit 18, the machining management unit 14 commands each unit to perform a predetermined protection operation (withdrawal operation). Examples of the protection operation (withdrawal operation) may include an operation in which a regenerative operation command is outputted to the inverter 102 such that the power for the motor 104 to perform a predetermined protection operation (withdrawal operation) is outputted and the motor 104 is stopped. Accordingly, each type of protection operations for protecting the motor 104, the tool and the drive axis which are connected to the motor 104, a workpiece machined by the tool, and the manufacturing line including such components are performed, and the machine tool is stopped.

Some or all of the time measurement unit 12, the abnormality determination unit 13, the storage unit 15, the output unit 16, the display unit 17, and the protection operation unit 18 as describe above may be provided in the numerical control device which houses the machining management unit 14. The time measurement unit 12, the abnormality determination unit 13, the machining management unit 14, and the protection operation unit 18 may be configured, e.g., in the form of a software program or may be configured by a combination of each type of electronic circuits and a software program. For example, when such units are configured in the form of a software program, an arithmetic processing device for an operation in accordance with the software program is provided and the software program is operated on a cloud server, thereby being capable of realizing a function of each unit as described above. Alternatively, the time measurement unit 12, the abnormality determination unit 13, the machining management unit 14, and the protection operation unit 18 may be realized as a semiconductor integrated circuit in which a software program that realizes a function of respective units is written.

The general configuration of the motor drive device when the motor 104 is a three-phase alternating current motor and the power supply is the alternating current power supply 103 has been describe above by way of example, but, for example, the motor 104 may be a three-phase alternating current motor and the power supply may be a direct current power supply, and in such a case, the rectifier 101 and the smoothing capacitor 105 are not provided and the voltage detection unit 11 is configured to detect a direct current voltage. Further for example, the motor 104 may be a direct current motor and the power supply may be the alternating current power supply 103, and in such a case, the inverter 102 is not provided and the voltage detection unit 11 is configured to detect an alternating current voltage. Further for example, the motor 104 may be a direct current motor and the power supply may be a direct current power supply, and in such a case, the rectifier 101, the inverter 102, and the smoothing capacitor 105 are not provided and the voltage detection unit 11 is configured to detect a direct current voltage.

Figure 4:
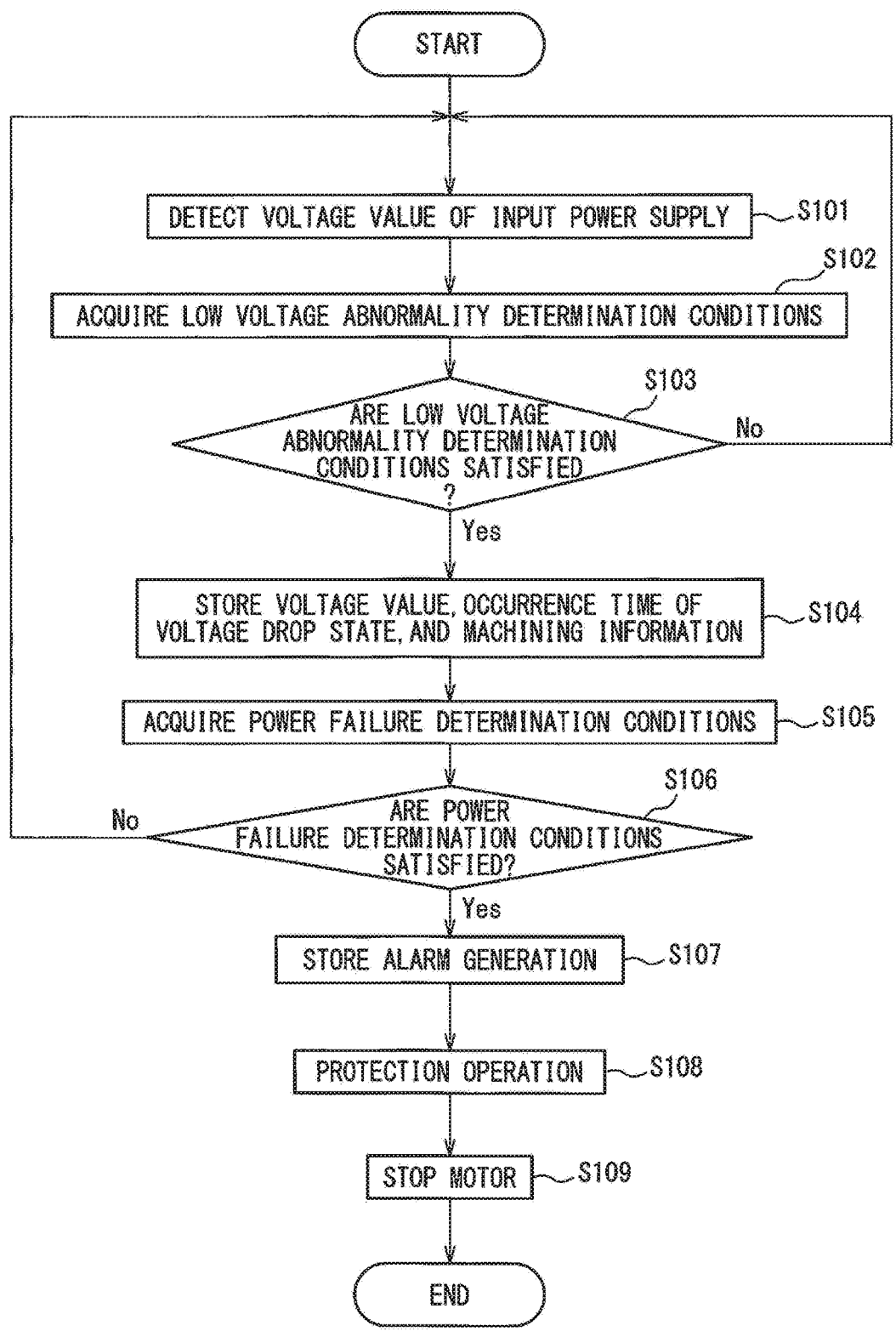
FIG. 4 is a flowchart illustrating an operation flow of the machine tool controller according to the embodiment of the present disclosure.

FIG. 4 is a flowchart illustrating an operation flow of the machine tool controller according to the embodiment of the present disclosure.

While the machine tool controller 1 operates to drive the motor 104, at step S101, the voltage detection unit 11 detects a voltage value of the input power supply used to drive the machine tool.

At step S102, the abnormality determination unit 13 acquires the low voltage abnormality determination conditions from the storage area as described above.

At step S103, the abnormality determination unit 13 determines whether the low voltage abnormality determination conditions are satisfied based on the voltage value detected by the voltage detection unit 11 and a duration time of a voltage drop state measured by the time measurement unit 12. In other words, when a state in which the voltage value detected by the voltage detection unit 11 is less than the first voltage threshold value $V_{Th1}$ continues over the first time threshold value $t_{Th1}$ or larger, since the low voltage abnormality determination conditions are satisfied, the abnormality determination unit 13 determines that a low voltage abnormality occurs with respect to the input power supply and outputs a warning signal to the storage unit 15, and a process advances to step S104. On the other hand, when the abnormality determination unit 13 determines that the low voltage abnormality determination conditions are unsatisfied, the process returns to step S101.

At step S104, in response to the warning signal received from the abnormality determination unit 13, the storage unit 15 stores the voltage value detected by the voltage detection unit 11, an occurrence time of the voltage drop state (i.e. low voltage abnormality) measured by the time measurement unit 12, and machining information acquired by the machining management unit 14.

At step S105, the abnormality determination unit 13 acquires the power failure determination conditions from the storage area as described above.

At step S106, the abnormality determination unit 13 determines whether the power failure determination conditions are satisfied based on the voltage value detected by the voltage detection unit 11 and the duration time of the voltage drop state measured by the time measurement unit 12. In other words, when a state in which the voltage value detected by the voltage detection unit 11 is less than the second voltage threshold value $V_{Th2}$ continues over the second time threshold value $t_{Th2}$ or larger, since the power failure determination conditions are satisfied, the abnormality determination unit 13 determines that a power failure occurs with respect to the input power supply and outputs an alarm signal to the storage unit 15 and the protection operation unit 18, and a process advances to step S107. On the other hand, when the abnormality determination unit 13 determines that the power failure determination conditions are unsatisfied, the process returns to step S101.

At step S107, in response to the alarm signal received from the abnormality determination unit 13, the storage unit 15 stores the voltage value detected by the voltage detection unit 11, the occurrence time of the voltage drop state (power failure in this case) measured by the time measurement unit 12, and the machining information acquired by the machining management unit 14 as already stored at step S104 together with a fact that "an alarm is generated".

At step S108, in response to the alarm signal received from the abnormality determination unit 13, the protection operation unit 18 outputs, to the machining management unit 14, a withdrawal operation command for preventing damage to the machine tool, the tool provided to the machine tool, or a workpiece machined by the tool. In response to the reception of the withdrawal operation command from the protection operation unit 18, the machining management unit 14 commands each unit to perform a predetermined protection operation (withdrawal operation). Accordingly, each type of protection operations for protecting the motor 104, the tool and the drive axis which are connected to the motor 104, a workpiece which is machined by the tool, the manufacturing line including such components are performed and the machine tool is stopped (step S109).

A content stored in the storage unit 15 through the above processing is outputted by the output unit 16 and displayed by the display unit 17. The display unit 17 displays the voltage value detected by the voltage detection unit 11 and the machining information acquired by the machining management unit 14 as associated with the occurrence time of the voltage drop state (low voltage abnormality or power failure), and thus the operator easily traces when and what power supply abnormality occurs and what influence is made on machining at such a time.

According to one aspect of the present disclosure, the machine tool controller which facilitates specification of a cause and traceability when a defect in a product as machined by the machine tool occurs at a time of an occurrence of an abnormality of the input power supply used to drive the machine tool can be realized.

According to one aspect of the present disclosure, since as a determination reference as to whether a low voltage abnormality occurs with respect to the input power supply, a first voltage threshold value and a first time threshold value are set, as a determination reference as to whether a power failure occurs with respect to the input power supply, a second voltage threshold value and a second time threshold value are set, and it is configured that there is a relationship that the second voltage threshold value is set to be a value smaller than the first voltage threshold value, while the second time threshold value is set to be a value larger than the first time threshold value, an protection operation at a time of an occurrence of a power failure which is a power supply abnormality at which a normal operation of the machine tool is difficult can be reliably performed, and further, since at a time of an occurrence of a low voltage abnormality which is such a slight power supply abnormality that a normal operation of the machine tool can continue but an influence on high precision machining and the like is feared, an occurrence state thereof is stored to be displayed on a display and the like, the specification of a cause and traceability when a defect in a product as machined by the machine tool occurs are facilitated.

Further, according to one aspect of the present disclosure, the display unit displays a voltage value detected by the voltage detection unit and machining information acquired by the machining management unit as associated with an occurrence time of a voltage drop state (low voltage abnormality or power failure), whereby the operator easily traces when and what power supply abnormality occurs and what influence is made on machining at such a time. For example, it becomes easy for the operator to find out a defective workpiece as machined at such a time based on the occurrence time of a low voltage abnormality and the machining information at such a time which are displayed by the display unit (improvement in traceability), and accordingly the total number of workpieces to be inspected can be reduced to reduce an inspection time and a failure to detect a defective product can be prevented. Further for example, when a defective workpiece is produced, the operator can easily specify a cause of a defect (trouble shooting) based on a display content of the display unit, which display content can be also utilized for future defect prevention measures, production plan proposals, and the like.

What is claimed is:
1. A machine tool controller comprising:
a voltage detection unit which detects voltage values of an input power supply used to drive a machine tool;
a time measurement unit which measures an occurrence time and a duration time of a voltage drop state when the voltage drop state occurs with respect to the voltage values detected by the voltage detection unit;
an abnormality determination unit which determines whether a low voltage abnormality or a power failure occurs with respect to the input power supply based on the voltage values detected by the voltage detection unit and the duration time of the voltage drop state measured by the time measurement unit in accordance with a predetermined low voltage abnormality determination condition and a predetermined power failure determination condition;
a machining management unit which acquires a machining condition command and machining information of the machine tool;
a storage unit which stores the voltage values detected by the voltage detection unit, the occurrence time of the voltage drop state measured by the time measurement unit, and the machining information acquired by the machining management unit when the abnormality determination unit determines that a low voltage abnormality occurs with respect to the input power supply; and
a display unit which displays a voltage waveform of the voltage values detected by the voltage detection unit in association with the machining information acquired by the machining management unit as machining instructions at the corresponding occurrence time of the voltage drop state measured by the time measurement unit,
wherein
the predetermined low voltage abnormality determination condition includes a first voltage threshold value and a first time threshold value which serve as a determination reference as to whether a low voltage abnormality occurs with respect to the input power supply, and the abnormality determination unit determines that the low voltage abnormality occurs with respect to the input power supply when a state in which the voltage values detected by the voltage detection unit are less than the first voltage threshold value continues over the first time threshold value or larger, and
the predetermined power failure determination condition includes a second voltage threshold value and a second time threshold value which serve as a determination reference as to whether a power failure occurs with respect to the input power supply, the second voltage threshold value is smaller than the first voltage threshold value, the second time threshold value is larger than the first time threshold value, and the abnormality determination unit determines that a power failure occurs with respect to the input power supply when a state in which the voltage values detected by the voltage detection unit are less than the second voltage threshold value continues over the second time threshold value or larger.

2. The machine tool controller according to claim 1, further comprising:
a protection operation unit which outputs a withdrawal operation command for preventing damage to the machine tool, a tool located at the machine tool, and a workpiece which is machined by the tool when the abnormality determination unit determines that a power failure occurs with respect to the input power supply.

* * * * *